(12) United States Patent
Ersek et al.

(10) Patent No.: US 10,014,813 B2
(45) Date of Patent: Jul. 3, 2018

(54) METHODS FOR SWITCHING ON AND FOR SWITCHING OFF AN N-PHASE ELECTRIC MACHINE IN A MOTOR VEHICLE

(71) Applicants: Robert Bosch GmbH, Stuttgart (DE); SEG AUTOMOTIVE GERMANY GMBH, Stuttgart (DE)

(72) Inventors: Zoltan Ersek, Stuttgart (DE); Julian Roesner, Untergruppenbach (DE)

(73) Assignees: ROBERT BOSCH GMBH, Stuttgart (DE); SEG AUTOMOTIVE GERMANY GMBH, Stuttgart (DE)

( * ) Notice: Subject to any disclaimer, the term of this patent is extended or adjusted under 35 U.S.C. 154(b) by 19 days.

(21) Appl. No.: 14/909,679

(22) PCT Filed: Jul. 24, 2014

(86) PCT No.: PCT/EP2014/065892
§ 371 (c)(1),
(2) Date: Feb. 2, 2016

(87) PCT Pub. No.: WO2015/014701
PCT Pub. Date: Feb. 5, 2015

(65) Prior Publication Data
US 2016/0181963 A1 Jun. 23, 2016

(30) Foreign Application Priority Data
Aug. 2, 2013 (DE) .......................... 10 2013 215 306

(51) Int. Cl.
*H02P 1/00* (2006.01)
*H02P 3/00* (2006.01)
(Continued)

(52) U.S. Cl.
CPC ............... *H02P 25/22* (2013.01); *H02P 1/46* (2013.01)

(58) Field of Classification Search
CPC .................................. H02P 25/22; H02P 1/46
(Continued)

(56) References Cited

U.S. PATENT DOCUMENTS

| 4,746,850 A | 5/1988 | Abbondanti |
| 6,137,203 A * | 10/2000 | Jermakian ............ H02K 1/2793 310/191 |

(Continued)

FOREIGN PATENT DOCUMENTS

| CN | 102545755 A | 7/2012 |
| CN | 102598502 A | 7/2012 |

(Continued)

OTHER PUBLICATIONS

International Search Report for PCT/EP2014/065892, dated Feb. 10, 2015.

*Primary Examiner* — Erick Glass
(74) *Attorney, Agent, or Firm* — Norton Rose Fulbright US LLP; Gerard Messina

(57) ABSTRACT

A method is provided for switching on and switching off an n-phase electric machine in a motor vehicle. The n-phase electric machine includes a rotor with a rotor winding, and a stator with an n-phase stator winding. An excitation current may be applied to the rotor, and an n-phase phase voltage may be applied to the stator. The excitation current is switched on or off, a parameter which influences a synchronous generated internal voltage is determined, and the phase voltage is switched on or off when the parameter which influences the synchronous generated internal voltage reaches a certain threshold value.

16 Claims, 5 Drawing Sheets

(51) Int. Cl.
*H02P 7/06* (2006.01)
*H02P 23/00* (2016.01)
*H02P 25/22* (2006.01)
*H02P 1/46* (2006.01)

(58) Field of Classification Search
USPC ......................................................... 318/519
See application file for complete search history.

(56) References Cited

U.S. PATENT DOCUMENTS

2010/0179023 A1* 7/2010 Loudot .................... B60K 6/26
477/3
2013/0300126 A1* 11/2013 Butzmann ............... F02B 63/04
290/1 A

FOREIGN PATENT DOCUMENTS

| DE | 19532477 A1 | 3/1996 |
| DE | 10119852 | 10/2002 |
| DE | 102010002390 | 9/2011 |
| DE | 102010031640 | 1/2012 |
| DE | 102010043492 | 5/2012 |
| DE | 102011003946 A1 | 8/2012 |
| JP | 2012-125105 | * 6/2012 |

* cited by examiner

METHODS FOR SWITCHING ON AND FOR SWITCHING OFF AN N-PHASE ELECTRIC MACHINE IN A MOTOR VEHICLE

FIELD OF THE INVENTION

The present invention relates to a method for switching on and a method for switching off an n-phase electric machine in a motor vehicle.

BACKGROUND INFORMATION

Electric machines may be utilized in motor vehicles for converting mechanical energy into electrical energy. These types of separately excited electric machines may be designed as claw pole generators, for example. Such electric machines may generate a multiphase three-phase current. Electric machines may include a rotor with an excitation winding (rotor winding) and a stator with a multiphase stator winding. With the aid of a rectifier connected downstream from the stator winding, a multiphase three-phase current may be rectified into a direct current and supplied, for example, to a direct voltage electrical system of the motor vehicle.

In hybrid vehicles, for example, electric machines may also be operated in motor mode and used as the drive of the hybrid vehicle. The electric machine may assist an internal combustion engine of the motor vehicle, in particular at low rotational speeds at which this internal combustion engine does not yet deliver its full torque (boost mode, turbo lag compensation).

The electric machine may be regulated in both operating modes with the aid of an excitation current through the excitation winding, or with the aid of a phase current through the stator windings, as control variables.

Utilizing the electric machine in particular as a drive in a vehicle may require frequent switching on and switching off of the electric machine. Switching the electric machine on and off, in particular at high rotational speeds, may prove to be problematic. If the phase voltage is switched on first, this may result in excessively high overshooting of the phase current. If an excitation voltage is switched on first, a synchronous generated internal voltage is initially induced in the stator which may interact unfavorably with the phase voltage to be subsequently switched on, which may result in high electrical and mechanical loads on the electric machine.

It is therefore desirable to provide an option for optimizing the switching on and switching off of an electric machine of a motor vehicle in order to avoid undesirable current spikes and associated electrical and mechanical loads.

SUMMARY

A method for switching on and a method for switching off an n-phase electric machine in a motor vehicle are provided according to the present invention.

By way of the present invention, an optimal switching time for switching the electric machine on and off is determined. A parameter which influences the synchronous generated internal voltage is hereby evaluated. The synchronous generated internal voltage is a notional auxiliary variable. For a machine operating at no load, the synchronous generated internal voltage corresponds to the voltage that is induced in the stator winding by the energized rotor winding or excitation winding (polar wheel). As a result of this evaluation, an optimal point in time is determined at which a phase voltage is applied to the stator winding (when the electric machine is switched on), or is disconnected from the stator winding (when the electric machine is switched off). This point in time is determined in such a way that no undesirable current spikes result. High electrical and mechanical loads during switching on and off of the electric machine are thus avoided.

The methods according to the present invention thus allow the electric machine to be switched on and off, regardless of a rotational speed of the electric machine and/or of an internal combustion engine of the motor vehicle. In particular, the present invention allows the electric machine to be switched on and off at high rotational speeds in a gentle manner.

The present invention is equally suited for a generator mode as well as a motor mode of the electric machine. The present invention is suitable for all types of motor vehicles and commercial vehicles, in particular also for hybrid vehicles.

In particular, the present invention allows the operation of the electric machine in motor mode, and assistance of the internal combustion engine. The electric machine may be switched on without problems and without large loads, even at high rotational speeds. For example, it is not necessary to wait until the rotational speed has fallen below an allowable limiting value before switching on the electric machine. The electric machine may be switched on at an advantageously best possible point in time.

A processing unit according to the present invention, for example a control unit of a motor vehicle, is configured, in particular by programming, for carrying out a method according to the present invention.

In addition, implementation of the method in the form of software is advantageous, since this involves particularly low costs, in particular when an executing control unit is also utilized for other tasks and is therefore present anyway. Suitable data carriers for providing the computer program are in particular diskettes, hard disk memories, flash memories, EEPROMs, CD-ROMs, DVDs, and others. Downloading a program via computer networks (Internet, intranet, etc.) is also possible.

Further advantages and embodiments of the present invention result from the description and the appended drawings.

It shall be understood that the features mentioned above and to be explained below may be used not only in the particular stated combination, but also in other combinations or alone without departing from the scope of the present invention.

The present invention is schematically illustrated in the drawings, based on exemplary embodiments, and is described in greater detail below with reference to the drawings.

DETAILED DESCRIPTION

Figure 1:
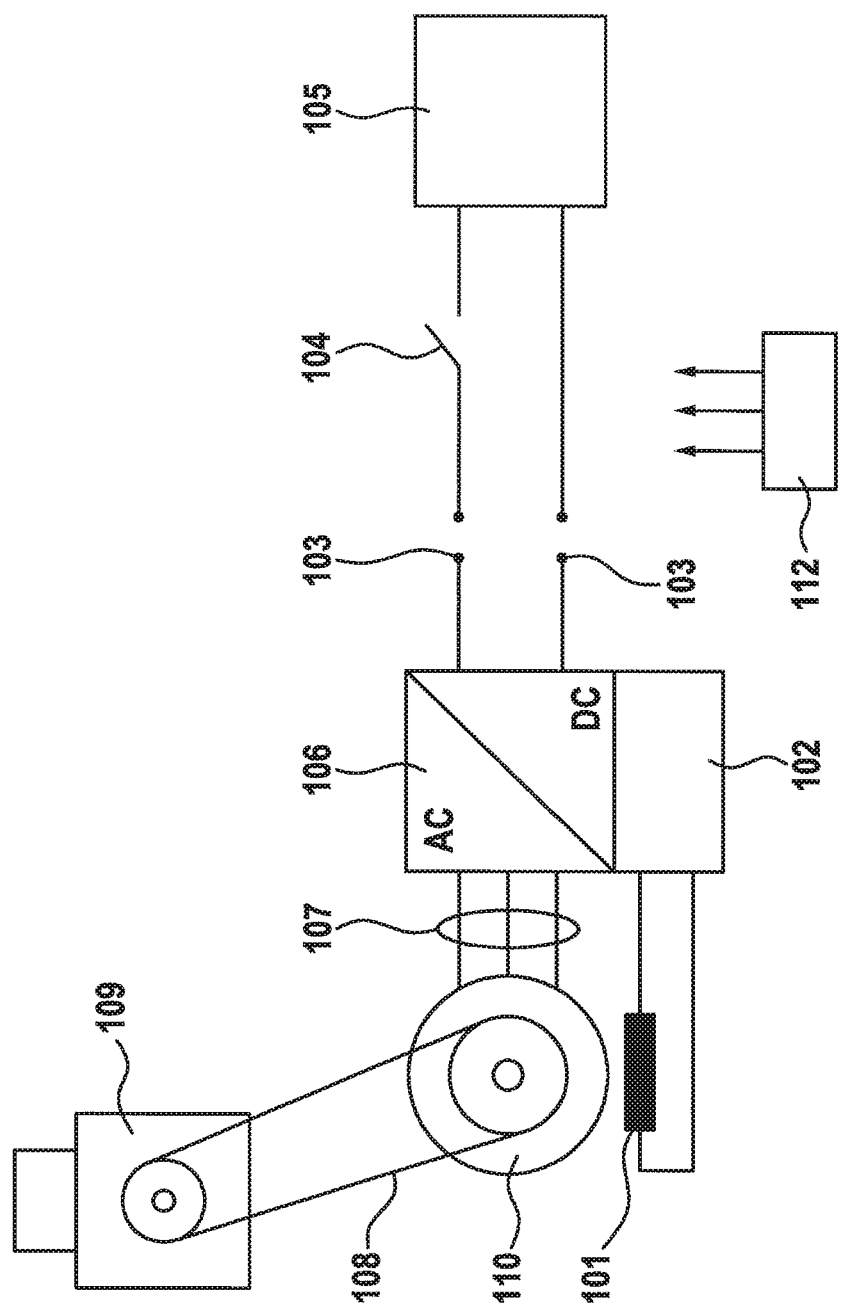
FIG. 1 schematically shows an internal combustion engine and an electric machine of a motor vehicle which are configured for carrying out one specific embodiment of the present invention.

FIG. 1 schematically shows components of a motor vehicle. The motor vehicle includes an electric machine 110, a separately excited synchronous generator, for example, being assumed in the following discussion. Electric machine 110 may be operated in generator mode, for example, via an internal combustion engine 109 of the motor vehicle. Electric machine 110 is connected to internal combustion engine 109 in a torque-locking manner via appropriate coupling means, for example a mechanical connection 108 in the form of a belt drive or a shaft. Alternatively, electric machine 110 may also be operated in motor mode, and may hereby assist internal combustion engine 109.

Electric machine 110 is electrically connected to a power converter 106, multiple phase connections 107 being provided. The power converter may be operated as a rectifier and as an inverter. The n phase connections 107 are phase connections of an n-phase stator winding of a stator of electric machine 110. A rotor winding 101 of electric machine 110 is connected on the direct voltage side via a field regulator 102. Field regulator 102 is responsible for controlling rotor winding 101. An energy store, for example a vehicle battery 105, may be connected to the direct voltage side of power converter 106 via direct voltage connections 103. Vehicle battery 105 may be connected to the direct voltage side of power converter 106, and disconnected from same, via a switching element 104.

A processing unit designed as a control unit 112 is configured, in particular by programming, for carrying out one specific embodiment of the present invention. In particular, control unit 112 controls field regulator 102, power converter 106, and switching element 104 according to the present invention.

Figure 2:
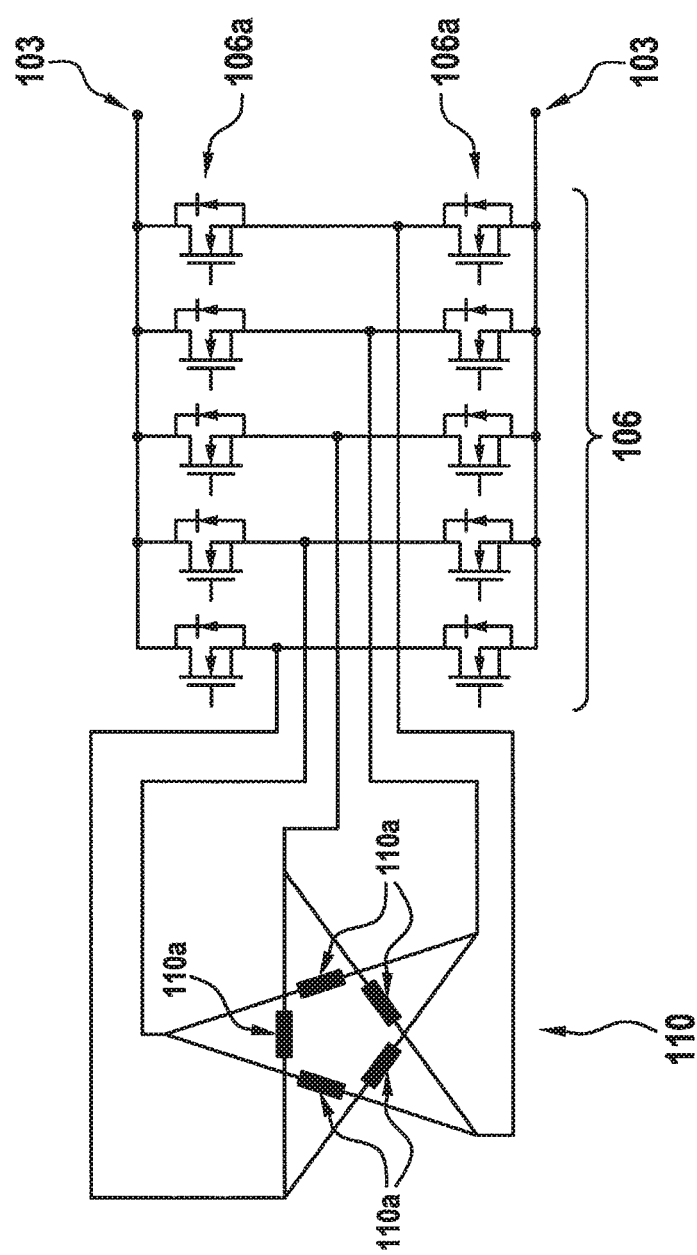
FIG. 2 shows, in the manner of a circuit diagram, a five-phase electric machine of a motor vehicle which is configured for carrying out one specific embodiment of the present invention.

FIG. 2 illustrates electric machine 110 in the manner of a circuit diagram. In this particular example, electric machine 110 is represented as a five-phase electric machine. Electric machine 110 includes a stator with a five-phase stator winding 110a. Power converter 106 includes multiple electrical switching elements, which in this particular example are designed as metal oxide semiconductor field effect transistors (MOSFETs) 106a. MOSFETs are made up of a transistor and an inverse diode connected in the reverse direction. MOSFETs 106a are connected to n-phase stator winding 110a on the one hand, and to direct voltage connections 103 on the direct voltage side, for example via busbars.

When electric machine 110 is operated in a generator mode, a five-phase alternating voltage, the so-called phase voltage, is generated in stator winding 110a. As the result of advantageous clocked control of MOSFETs 106a, this five-phase alternating voltage is rectified into a direct voltage. For example, vehicle battery 105 may be charged with the aid of this converted direct voltage.

When electric machine 110 is operated in a motor mode, the direct voltage of vehicle battery 105 is converted into the five-phase phase voltage by advantageous clocked control of MOSFETs 106a. The advantageous clocked control of MOSFETs 106a is carried out in each case by control unit 112.

It should be noted that the present invention is not intended to be limited to a five-phase electric machine, but, rather, is suitable for electric machines having an advantageous number of phase connections 107.

Preferred embodiments of the present invention for switching electric machine 110 on and off are described below with reference to FIGS. 3, 4, and 5. In addition, this description is carried out with reference to the particular example of a motor mode of electric machine 110. In particular, the preferred embodiments of the methods according to the present invention are carried out by control unit 112. In this regard, the control unit controls field regulator 102, power converter 106, and switching element 104 according to the present invention.

Figure 3:
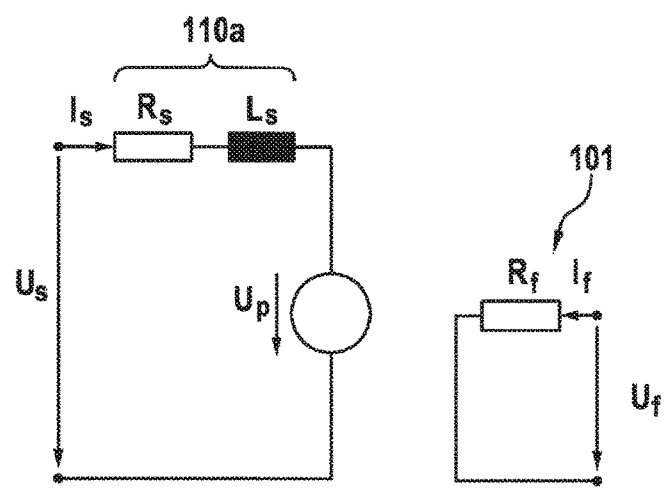
FIG. 3 schematically shows a single-phase equivalent circuit diagram of the five-phase electric machine from FIG. 2.

FIG. 3 schematically shows a single-phase equivalent circuit diagram of a separately excited synchronous machine in general, and five-phase electric machine 110 according to FIG. 2 in particular. In the equivalent circuit diagram, rotor winding 101 corresponds to a resistor $R_f$. In the equivalent circuit diagram, stator winding 110a corresponds to a series connection of a resistor $R_s$ and an inductor $L_s$.

Figure 4:
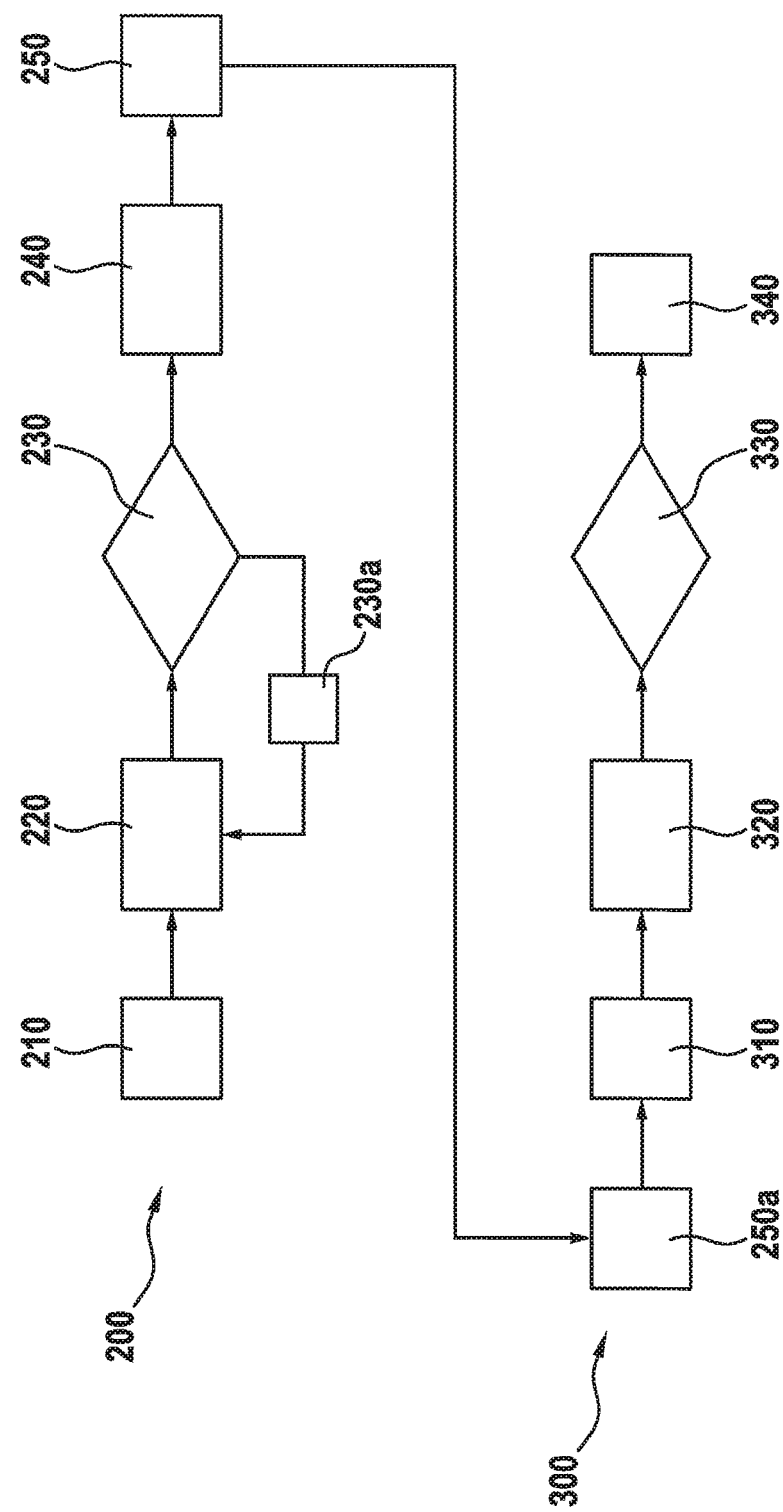
FIG. 4 schematically shows as a block diagram one preferred embodiment of a method according to the present invention for switching on and switching off an electric machine.

One preferred embodiment of a method according to the present invention for switching on 200 and for switching off 300 electric machine 110 is illustrated in FIG. 4 as a block diagram.

In the motor mode, electric machine 110 is supplied with an excitation voltage $U_f$ and phase voltage $U_s$, and converts this electrical energy into mechanical energy in order to assist internal combustion engine 109 with this mechanical energy. Electric machine 110 is initially switched off. Due to the torque-locked connection to internal combustion engine 109, the electric machine rotates at a rotational speed $\omega$ which is predefined by internal combustion engine 109. The electric machine is switched on by way of method 200 according to the present invention for switching on electric machine 110.

Excitation voltage $U_f$ is applied to rotor winding 101 with the aid of field regulator 102 in a step 210, as the result of which an excitation current $I_f$ is generated in rotor winding 101. Excitation current $I_f$ is controlled to a desired setpoint value in particular with the aid of a PI controller. Since phase voltage $U_s$ is not yet applied to stator winding 110a of the electric machine, excitation current $I_f$ induces a synchronous generated internal voltage $U_p$ in stator winding 110a when the electric machine rotates. Synchronous generated internal voltage $U_p$ is a function of rotational speed $\omega$ and of excitation current $I_f$.

A parameter which influences this synchronous generated internal voltage $U_p$ is determined in step 220. Synchronous generated internal voltage $U_p$ itself is preferably determined as the parameter which influences synchronous generated internal voltage $U_p$. Alternatively or additionally, excitation current $I_f$ and/or rotational speed $\omega$ of electric machine 110 may also preferably be determined as the parameter which influences synchronous generated internal voltage $U_p$. Rotational speed $\omega$ of electric machine 110 and excitation current $I_f$ are usually known anyway or are already determined in the motor vehicle. Therefore, no additional effort is required here for determining excitation current $I_f$ and/or rotational speed $\omega$ of electric machine 110 as the parameter which influences synchronous generated internal voltage $U_p$.

In this particular example, synchronous generated internal voltage $U_p$ itself is determined as the parameter which influences synchronous generated internal voltage $U_p$. Synchronous generated internal voltage $U_p$ is determined in particular as a function of excitation current $I_f$ and of rotational speed $\omega$. This determination is made in particular according to the following formula:

$$U_p = \Psi_R \frac{2\pi}{60} \omega.$$

$\Psi_R$ is a flux linkage generated by excitation current $I_f$. Due to saturation effects, the relationship between excitation current $I_f$ and flux linkage $\Psi_R$ is not linear. In particular, this relationship between excitation current $I_f$ and flux linkage $\Psi_R$ is stored, in particular in control unit 112, as a characteristic curve or in the form of a smoothing polynomial.

A check is made in step 230 as to whether synchronous generated internal voltage $U_p$, as the parameter which influences synchronous generated internal voltage $U_p$, reaches a certain threshold value. The threshold value is selected in such a way that undesirable current spikes and high electrical and mechanical loads are avoided when phase voltage $U_s$ is switched on. The threshold value is therefore selected in particular as a function of phase voltage $U_s$. The threshold value is accordingly selected in such a way that phase voltage $U_s$ is switched on at a point in time when synchronous generated internal voltage $U_p$ does not act against phase voltage $U_s$, which would result in high electrical and mechanical loads.

The threshold value thus advantageously corresponds to a voltage value of phase voltage $U_s$ immediately after switching-on takes place. This value is also referred to as an "instantaneous" value, although, of course, it is only theoretically present prior to switching on. In particular, this means that when the threshold value is reached, synchronous generated internal voltage $U_p$ and phase voltage $U_s$ have the same level or the same amplitude immediately after switching-on takes place. The level or amplitude of instantaneous phase voltage $U_s$ is predefined by the direct voltage of vehicle battery 105 which is applied to power converter 106.

As long as synchronous generated internal voltage $U_p$ is less than phase voltage $U_s$, no phase current $I_s$ can flow over the inverse diodes of MOSFETs 106a of power converter 106.

The level or amplitude of synchronous generated internal voltage $U_p$ may be set via excitation current $I_f$. If synchronous generated internal voltage $U_p$ does not reach the threshold value, excitation current $I_f$ may therefore advantageously be changed in a step 230a. Synchronous generated internal voltage $U_p$ is then redetermined according to step 220, and the check according to step 230 is carried out once again.

If synchronous generated internal voltage $U_p$ reaches the threshold value, i.e., synchronous generated internal voltage $U_p$ and phase voltage $U_s$ have the same amplitude immediately after switching-on takes place, phase voltage $U_s$ is switched on in step 240. Five-phase phase voltage $U_s$ is applied to phase connections 107 of stator winding 110a, in particular by power converter 106. Phase voltage $U_s$ is switched on in phase with synchronous generated internal voltage $U_p$. Excitation current $I_f$ has a value which generates a synchronous generated internal voltage $U_p$, whose amplitude corresponds to externally applied phase voltage $U_s$.

Alternatively, if excitation current $I_f$ is determined in step 220 as the parameter which influences synchronous generated internal voltage $U_p$, a corresponding value of excitation current $I_f$ is used as the threshold value. If excitation current $I_f$ differs from the threshold value in step 230, excitation current $I_f$ is advantageously changed in step 230a, redetermined in step 220, and checked once again in step 230 as to whether the threshold value is reached.

A relationship between phase voltage $U_s$, synchronous generated internal voltage $U_p$, phase current $I_s$, and excitation current $I_f$, and thus, the theoretical basis of the methods according to the present invention, are explained in greater detail with reference to FIG. 5.

FIG. 5 illustrates, as an example, vector diagrams or dq diagrams 501 through 503 of a separately excited synchronous machine, in particular five-phase electric machine 110 according to FIG. 2, in a dq coordinate system having a fixed rotary field; these vector diagrams may be determined by way of one specific embodiment of the present invention.

By definition, synchronous generated internal voltage $U_p$ is situated on the q axis, and is illustrated as a first vector. The q axis forms the so-called excitation axis. The d axis is electrically orthogonal with respect to the q axis. Phase voltage $U_s$ is illustrated as a second vector, and is shifted by a phase angle $\vartheta$ with respect to synchronous generated internal voltage $U_p$. Phase angle $\vartheta$ is also referred to as the control angle, the polar wheel angle, or the load angle. In the generator mode of electric machine 110, phase angle $\vartheta$ takes on positive values, and a polar wheel or the exciter "is ahead." In the motor mode of electric machine 110, as illustrated in FIG. 5, phase angle $\vartheta$ takes on negative values, and the polar wheel or the exciter "lags."

The level of phase voltage $U_s$ is predefined by the direct voltage of vehicle battery 105 which is applied to power converter 106. Therefore, phase voltage $U_s$ may vary only in its phase position with respect to synchronous generated internal voltage $U_p$, i.e., over its phase angle $\vartheta$ relative to synchronous generated internal voltage $U_p$. The phase position or phase angle $\vartheta$ may advantageously be set with the aid of power converter 106.

Phase current $I_s$ is illustrated as a third vector in the dq coordinate system. Depending on the phase position or phase angle $\vartheta$, a different phase current $I_s$ results. Phase current $I_s$ or the vector, i.e., the tip of the vector of phase current $I_s$ describes a circle in the dq coordinate system.

Figure 5A:
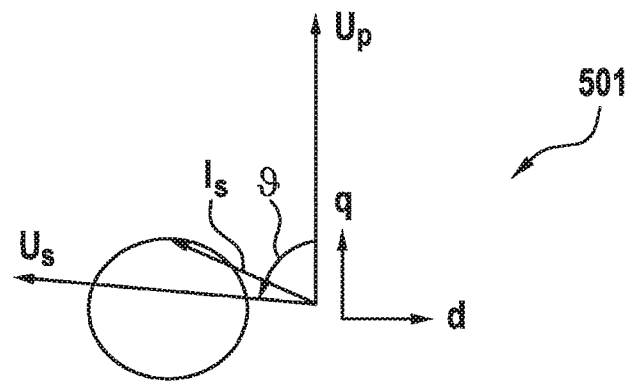
FIG. 5 schematically shows vector diagrams which may be determined by way of one specific embodiment of the present invention.

FIG. 5a illustrates a first dq diagram 501 in which synchronous generated internal voltage $U_p$, as the parameter which influences synchronous generated internal voltage $U_p$, does not reach the threshold value. It is apparent that phase current $I_s$ does not become zero for any phase angle $\vartheta$. Switching on electric machine 110 without overshooting is not possible.

Figure 5B:
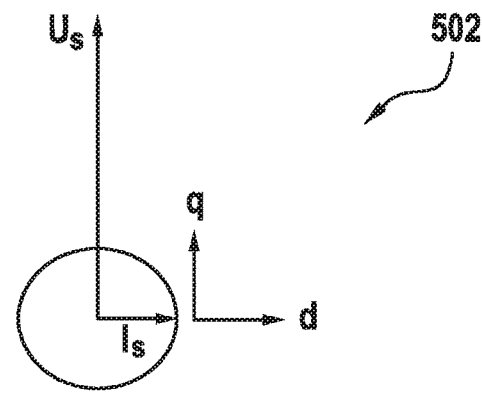

FIG. 5b illustrates a second dq diagram 502 in which excitation current $I_f$ is switched off, i.e., has the value zero. Accordingly, synchronous generated internal voltage $U_p$ also has the value zero. Here as well, it is apparent that phase current $I_s$ does not become zero for any phase angle $\vartheta$. In this case as well, switching on electric machine 110 without overshooting is not possible.

Figure 5C:
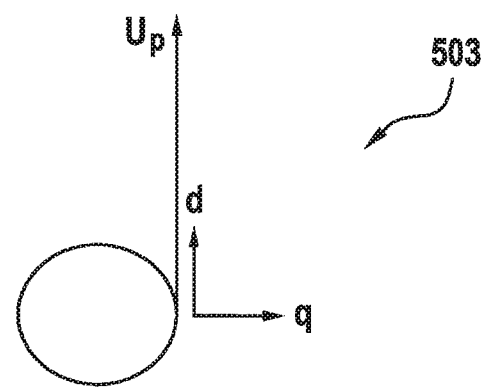

FIG. 5c illustrates a third dq diagram 503 in which synchronous generated internal voltage $U_p$, as the parameter which influences synchronous generated internal voltage $U_p$, reaches the threshold value. Phase angle $\vartheta$ is 90°, so that the phase position of phase voltage $U_s$ corresponds to a phase position of synchronous generated internal voltage $U_p$. Since phase voltage $U_s$ and synchronous generated internal voltage $U_p$ are equal with respect to absolute value and phase, no phase current $I_s$ is generated.

As the result of switching on phase voltage $U_s$ in step 240, electric machine 110 is switched on and may assist internal combustion engine 109. A torque of electric machine 110 or of internal combustion engine 109 is now advantageously set in step 250. The torque is set by varying phase angle $\vartheta$. Phase angle $\vartheta$ is varied via an advantageous control loop in such a way that a desired torque is set.

If electric machine 110 is to be switched off again, this takes place by way of method 300 according to the present invention for switching off electric machine 110.

The torque and phase angle $\vartheta$ are set to a certain value in step 250a, similarly as for step 250. The torque is set to a minimum value, in particular to the value zero, in step 250a. Phase angle $\vartheta$ is set in particular to the value 90°. Phase voltage $U_s$ is thus in phase with synchronous generated internal voltage $U_p$, and the lowest possible phase current $I_s$ is generated. This is in particular a pure reactive current.

Excitation current $I_f$ is switched off in step 310. Field regulator 102 disconnects rotor winding 101 from applied excitation voltage $U_f$. Excitation current $I_f$ slowly dies down due to a time constant of the excitation circuit.

The parameter which influences synchronous generated internal voltage $U_p$ is determined in step 320, similarly as for step 220. In this particular example, synchronous generated internal voltage $U_p$ itself is preferably determined in step 320 as the parameter which influences synchronous generated internal voltage $U_p$. Synchronous generated internal voltage $U_p$ is determined in particular as a function of excitation current $I_f$ and of rotational speed $\omega$.

A check is made in step 330 as to whether synchronous generated internal voltage $U_p$, as the parameter which influences synchronous generated internal voltage $U_p$, reaches the threshold value. In this case as well, the threshold value is preferably the instantaneous voltage value of phase voltage $U_s$. A check is preferably made as to whether synchronous generated internal voltage $U_p$ falls below the instantaneous voltage value of phase voltage $U_s$. If this is the case, phase current $I_s$ becomes zero.

If synchronous generated internal voltage $U_p$ were further reduced with the control of power converter 106 switched on, phase current $I_s$ would once again increase in the positive d direction. Alternatively or additionally, the ascertainment of the suitable switching-off time of phase voltage $U_s$ may take place by detecting phase current $I_s$ as the parameter which influences synchronous generated internal voltage $U_p$. In particular, a check is made as to whether phase current $I_s$ reaches a threshold value.

If synchronous generated internal voltage $U_p$, as the parameter which influences synchronous generated internal voltage $U_p$, reaches the threshold value, i.e., synchronous generated internal voltage $U_p$ thus preferably has the instantaneous voltage value of phase voltage $U_s$, phase voltage $U_s$ is switched off in step 340. Power converter 106 disconnects phase connections 107 of stator winding 110a from five-phase phase voltage $U_s$. Alternatively or additionally, the control of power converter 106 may be deactivated.

The switching off of phase voltage $U_s$ takes place in a de-energized state. Although excitation current $I_f$ still has a value different from zero, excitation current $I_f$ can no longer generate a current flow through the inverse diodes of power converter 106.

What is claimed is:

1. A method for switching on an n-phase electric machine in a motor vehicle, the n-phase electric machine that includes a rotor with a rotor winding and to which an excitation current may be applied, and a stator with an n-phase stator winding and to which an n-phase voltage may be applied, the method comprising:
   switching on the excitation current in order to energize the rotor winding, wherein during a first time period when the rotor winding is energized the n-phase electric machine is switched off;
   determining a parameter which influences a synchronous generated internal voltage, wherein the synchronous generated internal voltage corresponds to a voltage that is induced in the stator winding by the energized rotor winding during the first time period when the n-phase electric machine is switched off; and
   after the first time period, switching on the n phase electric machine by applying the phase voltage to the stator when the parameter which influences the synchronous generated internal voltage reaches a certain threshold value, wherein the threshold value corresponds to a value of the phase voltage immediately after the switching on takes place.

2. The method as recited in claim 1, further comprising setting a torque with the aid of a phase angle of the phase voltage when the phase voltage is switched on.

3. The method as recited in claim 1, wherein the certain threshold value of the synchronous generated internal voltage, as the parameter which influences the synchronous generated internal voltage, corresponds to an instantaneous voltage value of the phase voltage.

4. The method as recited in claim 1, wherein at least one of the excitation current and a rotational speed of the electric machine is determined as the parameter which influences the synchronous generated internal voltage.

5. The method as recited in claim 1, wherein the electric machine is operated in one of a motor mode or a generator mode.

6. The method as recited in claim 1, wherein:
   the synchronous generated internal voltage that is present while the n-phase electric machine is switched off is a function of a rotational speed of the n-phase electric machine,
   the rotational speed of the n-phase electric machine is predefined by an internal combustion engine to which the n-phase electric machine is connected,
   the synchronous generated internal voltage is further a function of the excitation current.

7. A method for switching off an n-phase electric machine in a motor vehicle, the n-phase electric machine including a rotor with a rotor winding and to which an excitation current may be applied, and a stator with an n-phase stator winding and to which an n-phase voltage may be applied, the method comprising:
   switching off the excitation current;
   determining a parameter which influences a synchronous generated internal voltage; and
   switching off the n phase electric machine by disconnecting the phase voltage from the stator when the parameter which influences the synchronous generated internal voltage reaches a certain threshold value, wherein the threshold value is an instantaneous voltage value of the phase voltage.

8. The method as recited in claim 7, further comprising setting a torque to a certain value with the aid of a phase angle of the phase voltage before the excitation current is switched off.

9. The method as recited in claim 8, wherein the torque is set to zero.

10. The method as recited in claim 7, wherein a phase current becomes zero when the synchronous generated internal voltage falls below the threshold value corresponding to the instantaneous voltage value of the phase voltage.

11. A processing unit configured for carrying out a method for switching on an n-phase electric machine in a motor vehicle, the n-phase electric machine that includes a rotor with a rotor winding and to which an excitation current may be applied, and a stator with an n-phase stator winding and to which an n-phase voltage may be applied, the method comprising:
- switching on the excitation current in order to energize the rotor winding, wherein during a first time period when the rotor winding is energized the n-phase electric machine is switched off;
- determining a parameter which influences a synchronous generated internal voltage, wherein the synchronous generated internal voltage corresponds to a voltage that is induced in the stator winding by the energized rotor winding during the first time period when the n-phase electric machine is switched off; and
- after the first time period, switching on the n phase electric machine by applying the phase voltage to the stator when the parameter which influences the synchronous generated internal voltage reaches a certain threshold value, wherein the threshold value corresponds to a value of the phase voltage immediately after the switching on takes place.

12. The processing unit as recited in claim 11, wherein:
- the synchronous generated internal voltage that is present while the n-phase electric machine is switched off is a function of a rotational speed of the n-phase electric machine,
- the rotational speed of the n-phase electric machine is predefined by an internal combustion engine to which the n-phase electric machine is connected,
- the synchronous generated internal voltage is further a function of the excitation current.

13. A computer program which prompts a processing unit to carry out a method for switching on an n-phase electric machine in a motor vehicle, the n-phase electric machine that includes a rotor with a rotor winding and to which an excitation current may be applied, and a stator with an n-phase stator winding and to which an n-phase voltage may be applied, the method comprising:
- switching on the excitation current in order to energize the rotor winding, wherein during a first time period when the rotor winding is energized the n-phase electric machine is switched off;
- determining a parameter which influences a synchronous generated internal voltage, wherein the synchronous generated internal voltage corresponds to a voltage that is induced in the stator winding by the energized rotor winding during the first time period when the n-phase electric machine is switched off; and
- after the first time period, switching on the n phase electric machine by applying the phase voltage to the stator when the parameter which influences the synchronous generated internal voltage reaches a certain threshold value, wherein the threshold value corresponds to a value of the phase voltage immediately after the switching on takes place.

14. The computer program as recited in claim 13, wherein:
- the synchronous generated internal voltage that is present while the n-phase electric machine is switched off is a function of a rotational speed of the n-phase electric machine,
- the rotational speed of the n-phase electric machine is predefined by an internal combustion engine to which the n-phase electric machine is connected,
- the synchronous generated internal voltage is further a function of the excitation current.

15. A machine-readable memory medium having a computer program which prompts a processing unit to carry out a method for switching on an n-phase electric machine in a motor vehicle, the n-phase electric machine that includes a rotor with a rotor winding and to which an excitation current may be applied, and a stator with an n-phase stator winding and to which an n-phase voltage may be applied, the method comprising:
- switching on the excitation current in order to energize the rotor winding, wherein during a first time period when the rotor winding is energized the n-phase electric machine is switched off;
- determining a parameter which influences a synchronous generated internal voltage, wherein the synchronous generated internal voltage corresponds to a voltage that is induced in the stator winding by the energized rotor winding during the first time period when the n-phase electric machine is switched off; and
- after the first time period, switching on the n phase electric machine by applying the phase voltage to the stator when the parameter which influences the synchronous generated internal voltage reaches a certain threshold value, wherein the threshold value corresponds to a value of the phase voltage immediately after the switching on takes place.

16. The machine readable memory medium as recited in claim 15, wherein:
- the synchronous generated internal voltage that is present while the n-phase electric machine is switched off is a function of a rotational speed of the n-phase electric machine,
- the rotational speed of the n-phase electric machine is predefined by an internal combustion engine to which the n-phase electric machine is connected,
- the synchronous generated internal voltage is further a function of the excitation current.

* * * * *